Patented Dec. 8, 1936

2,063,488

UNITED STATES PATENT OFFICE 2,063,488

PROCESS FOR REACTING CAUSTIC LIME AND GYPSUM

Parker C. Choate, Essex, and Amos K. Hobby, Canton, Mass.

No Drawing. Application November 1, 1933, Serial No. 696,294

4 Claims. (Cl. 106—34)

This process involves a desirable method of reacting anhydrous caustic lime and hydrous gypsum rock.

When such a proportioned mixture in a container is initiated by applied heat at a temperature at which $H_2O$ vapor is liberated from the gypsum, which temperature is practically about 80° C., such $H_2O$ vapor seeks to escape as momentarily free, but finding CaO in adjacent admixture, unites with it to form $CaO_2H_2$ known as lime hydrate.

This hydrating reaction is very exothermic at any temperature under that of hydrate decomposition, usually considered above 300° C.

The decomposition of gypsum $CaSO_4, 2H_2O$ is an endothermic reaction, thus requiring an initiated temperature to start reaction and a temperature above such initiation to enable the continuance of mass reaction.

The balance of reaction, involving exchange of $H_2O$ in a mixed mass, as cited, is such as to rapidly raise the mass temperature to above 200° C., where the proportions of mixture are such that the CaO is adequate to absorb largely the $H_2O$ contained in the gypsum.

Gypsum forms two salts, $CaSO_4, \frac{1}{2}H_2O$ and $CaSO_4$, the former known as hemi-hydrate and the latter as anhydrite, which latter, if not over-heated, is known as soluble anhydrite.

The hemi-hydrate is atmospherically stable under 150° C. approximately, but above 150° C. is decomposed, liberating its $\frac{1}{2}H_2O$, forming the soluble anhydrite, which is not stable and rapidly, by air exposure, absorbs moisture, forming the hemi-hydrate.

The following mix proportions illustrate the formation of a hydrate-hemihydrate mixture as the result of reaction, also a hydrate-anhydrite mixture, as the result, if the mass reaction temperature exceeds 150° C. in practice.

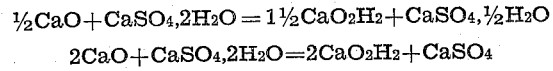

$$2CaO + CaSO_4, 2H_2O = 2CaO_2H_2 + CaSO_4$$

In the first formula, the theory is carried out but in practice difficulty is experienced in maintaining a mass temperature not to exceed 150° C., so that $H_2O$ is liberated from the hemi-hydrate to escape as lost or to be in excess of that capable of absorption by CaO.

The use of more CaO as in the anhydrite formula is more desirable, both to reduce the loss or excess $H_2O$ present in a reaction that is difficult to regulate below 150° C., also to reduce the percent of hemi-hydrate, known as plaster of Paris in the product carrying admixed lime hydrate.

Both mixes, as per formulae, may be used, or more or less CaO than is shown in either, as exposure to moist air or a sprinkle of water will hydrate any CaO existing or convert the $CaSO_4$ to $CaSO_4, \frac{1}{2}H_2O$.

This act is known and described as ageing as practiced upon gypsum calcines.

Fine grinding of the lime and gypsum has been described, the mixture being heated in containers, but such grinding is difficult and expensive, and due to tendency of the reacting mixture to form pasty masses, defeating voids, and causing very uneven reaction degrees with localized excessive temperatures, such acts are inadvisable, as creating economic inoperativeness.

The invention herein specified, involves adequate sizing of the crushed lime and gypsum used in reaction, a hammer-milled product up to about $\frac{3}{8}''$ cross section is desirable, such mixture to be placed in a container in any desired commercial bulk, whereupon a temperature of initiation is started by any local application of heat, establishing an exothermic local zone, by the attack of liberated $H_2O$ vapor upon adjacent CaO, then allowing such reaction to propagate through the mass.

If carefully performed the result will be a fairly complete mass reaction, the nature of activity of materials in use, the size and nature of the container, and crushed particles, also physical mass radiation, effecting the temperature, and time or rate of reaction.

A static or quiescent mass is herein specified, because attempts to move the mass by gravity or mass pressure action to enable a continuous process action, will destroy all voids and result in $H_2O$ vapor pockets and explosions, or economic failure.

In the operation of a static process care must be taken not to exceed a depth of over 24 inches, or gravity or swelling pressure will force uneven erratic reaction.

The temperature of reaction is best controlled by using impure or filmed lime caustic or dolomites or slow reacting mixtures.

No specific rule can be specified as there is a great variation in limes in reactivity.

The ignition may be by any means, such as a local steam jacket or an electric resistor, or a little water or steam applied to the local portion, where initiation is to be started, usually at the bottom of the mass mixture.

The operation of this process is very empirical, so far as control of temperature or quality of product is concerned, and must be developed for each lime and gypsum contacted.

The initiation with propagation is not empirical but true theory, starting by the liberation of 1% or so of the $H_2O$ involved, and propagating with great assurance, at a rate established by the conditions involved.

Any form of container may be used, or a mere mass in a heap, the degree of radiation of mass heat subject to the empirical tests, or conditions imposed to control an even mass reaction. If the temperature is allowed to much exceed 200° C. in any portion, the gypsum or the lime may be overheated and its quality damaged.

The product of such a reaction will be stratified layers of hydrate and calcined gypsum in more or less friable lumps, which must be ground to bring homogeneity, and mix the varied qualities of plasticity or softness to bring uniformity.

This academic step of initiating a temperature of reaction in a local portion of a mixed mass to be reacted is essential to any such reaction process, the control of the reacting mass during the propagation of reaction constituting further invention in the art.

As properly reacted, the product is useful as a wall plaster, possessing the quick setting property of calcined gypsum, with the smoothness of lime hydrate, resulting in a finished hardened product, superior to mechanical mixtures of lime hydrate and calcined gypsum, also being cheaper to prepare.

We claim:

1. The process of reacting static and quiescent mass mixtures of caustic lime and gypsum rock, by initiating reaction in a portion of the mass, and permitting such exothermic reaction to propagate itself through such mass, causing the heat of reaction to calcine the gypsum, and the $H_2O$ of liberation to hydrate the caustic lime.

2. The process of reacting non-moving mixtures of sized caustic lime and gypsum pieces, which consists in proportioning reactive weights, then causing a temperature in a part, adequate to liberate $H_2O$ vapor from the gypsum, which $H_2O$ attacks adjacent lime, causing exothermic reaction, then allowing such reaction to propagate through the mass, hydrating CaO and calcining gypsum.

3. The process of reacting static mixtures of caustic lime and gypsum, which consists in adding water to a portion of the mass to initiate reaction, then permitting mass reaction by exothermic propagation, causing hydration of CaO and calcination of gypsum.

4. The process of reacting static mixtures of caustic lime and gypsum, which consists in heating a portion of the mixture to liberate $H_2O$ by means of an inserted electric resistor, then permitting mass reaction by exothermic propagation, causing hydration of CaO and calcination of gypsum.

PARKER C. CHOATE.
AMOS K. HOBBY.